(No Model.)

J. F. SEIBERLING.
PNEUMATIC TIRE.

No. 564,293. Patented July 21, 1896.

Witnesses
John H. Thomas
E. J. West

Inventor
John F. Seiberling
By his Attorney
C. A. Humphrey

UNITED STATES PATENT OFFICE.

JOHN F. SEIBERLING, OF AKRON, OHIO.

PNEUMATIC TIRE.

SPECIFICATION forming part of Letters Patent No. 564,293, dated July 21, 1896.

Application filed November 19, 1895. Serial No. 569,437. (No model.)

*To all whom it may concern:*

Be it known that I, JOHN F. SEIBERLING, a citizen of the United States, residing at Akron, in the county of Summit and State of Ohio, have invented a certain new and useful Improvement in Pnuematic Tires, of which the following is a specification.

My invention has relation to improvements in pneumatic tires for bicycles and other vehicles; and it has for its object the production of a tire which shall have all the advantages of the ordinary rubber pneumatic tire, but shall permit the puncture of the "tread" without permitting the escape of air so as to collapse.

To the aforesaid object my invention consists in the peculiar and novel construction, arrangement, and combination of parts hereinafter described, and then specifically pointed out in the claims, reference being had to the accompanying drawings, forming a part of this specification.

Figure 1:
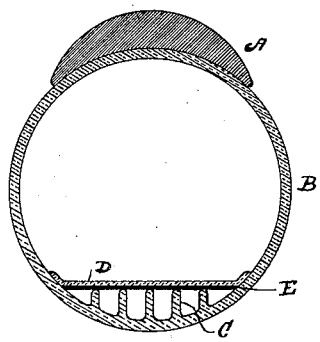

Referring to Figure 1 of the drawings, A is the wheel-rim, and B the tire, which is of the usual form, being a continuous tube. From the inner face of this tire, opposite the tread, extend inwardly a series of annular webs C of different widths, but adapted to meet a common plane, parallel with the horizontal axis of the tube. Across the inside of the tube is a continuous diaphragm D, united on each side with the tube B, and surrounding this diaphragm is a metallic plate E, against which the webs C rest. It will thus be seen that the tread of the tire is constantly sustained by the webs C in their pressure against the plate E, and that any puncture of the tread outside of the diaphragm D will not permit of an escape of air, thereby affording a twofold protection against disability from accident.

Figure 2:
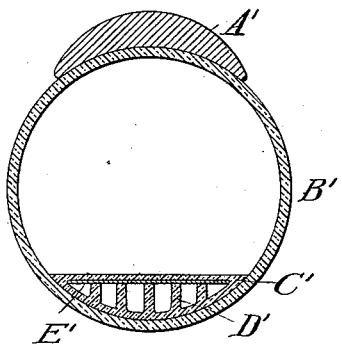

In the form shown in Fig. 2, Sheet 2, which is a modification of the same tire, A' is the wheel-rim and B' the tire, which consists, as in the other form, of a continuous rubber tube of the ordinary construction. Within this tube and opposite the tread is inserted a second tube C', in the form of a segment of a circle in cross-section, the curved face being concentric with and fitting the inside of the tube B'. Extending inwardly from the curved face of the tube C' are a series of continuous webs D' of different depths, but with their edges ending in a common plane and touching a continuous metallic plate E', resting on the flat side of the tube C'. It will thus be seen, as in the other form, that the outer part of the tire is constantly sustained from within by the webs D', resting on the plate E', and any puncture in the tread of the tire will not permit the escape of air from the tire B'.

I claim as my invention—

1. An improved pneumatic tire, consisting essentially of a continuous rubber tube, and a continuous tube being a segment of a circle in cross-section, fitting inside of said first tube, and having a metallic plate on its inner flat side and a series of webs extending from its inner curved face and resting on said plate, substantially as shown and described.

2. An improved pneumatic tire, consisting essentially of a continuous rubber tube having a series of internal webs extending from the tread portion to a common plane, a continuous metallic plate contiguous to the edges of said webs, and a rubber diaphragm within said plate and united with said tube on opposite sides, substantially as shown and described.

In testimony that I claim the above I hereunto set my hand.

JOHN F. SEIBERLING.

In presence of—
  J. H. THOMAS,
  C. E. HUMPHREY.